Aug. 15, 1944.　　　R. E. LONG　　　2,355,983
ELECTRIC WELDING MACHINE
Filed Jan. 23, 1943　　　3 Sheets-Sheet 1

INVENTOR
Russell E. Long
BY
*Dean Fairbanks Hirsch*
ATTORNEYS

Aug. 15, 1944.  R. E. LONG  2,355,983
ELECTRIC WELDING MACHINE
Filed Jan. 23, 1943   3 Sheets-Sheet 2
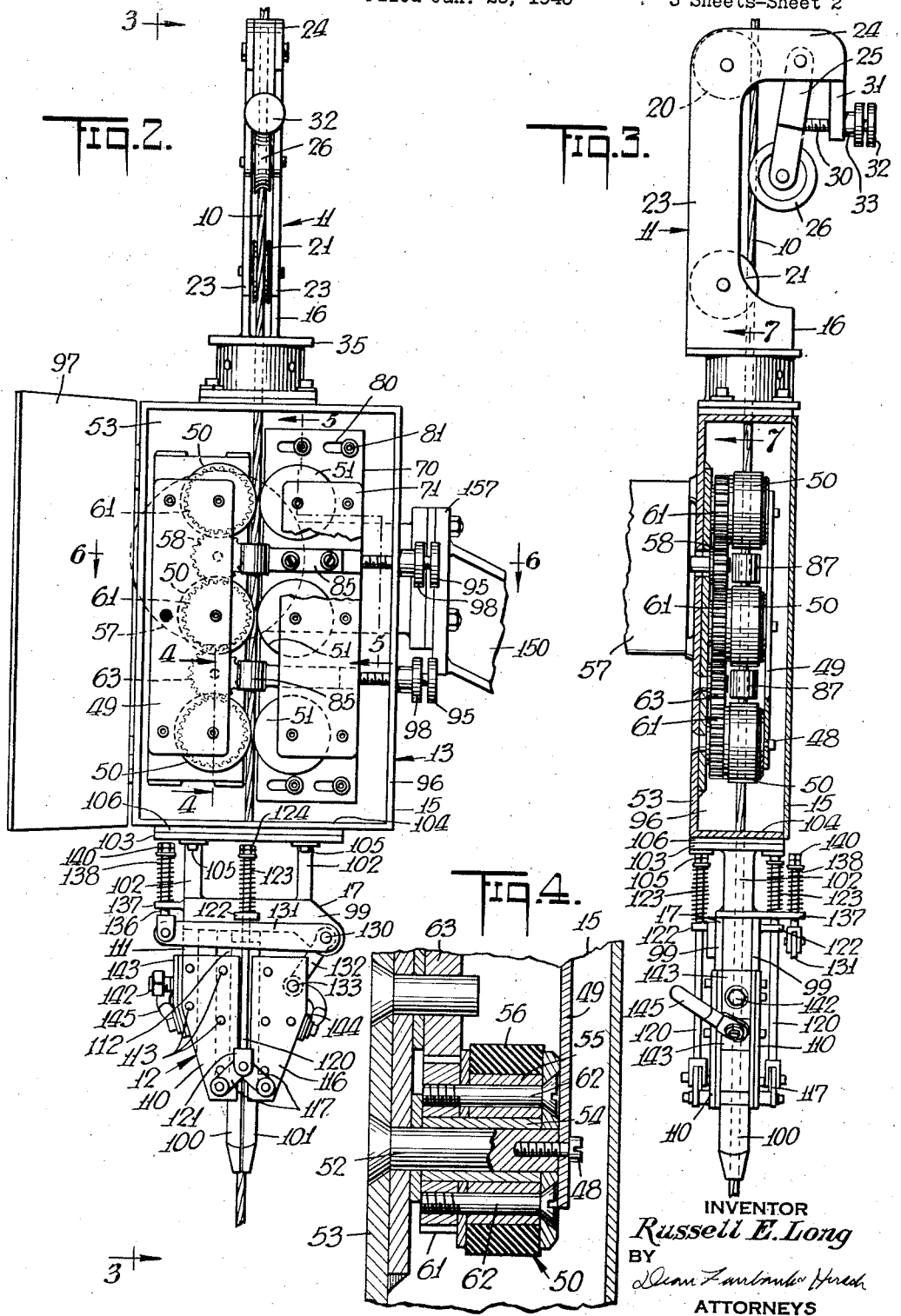
INVENTOR
Russell E. Long
BY
ATTORNEYS Aug. 15, 1944.   R. E. LONG   2,355,983
ELECTRIC WELDING MACHINE
Filed Jan. 23, 1943   3 Sheets-Sheet 3
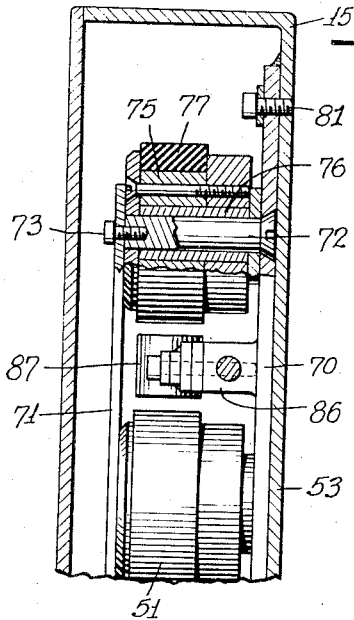
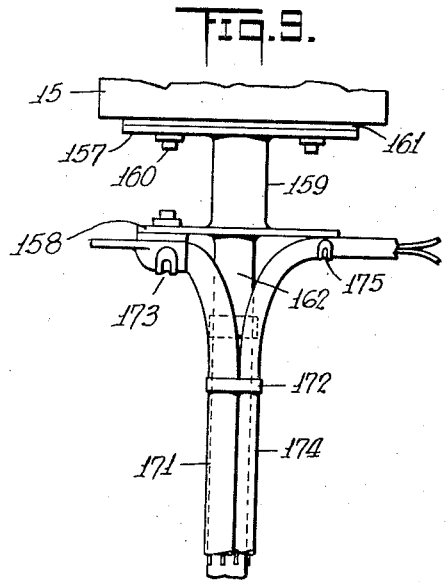
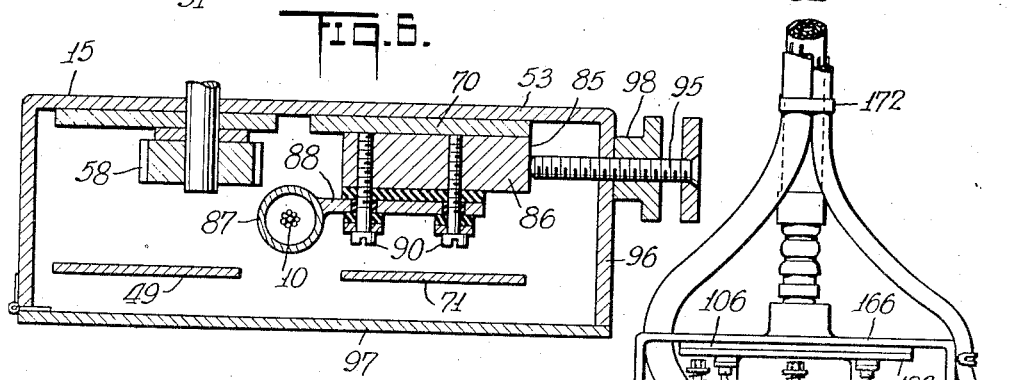
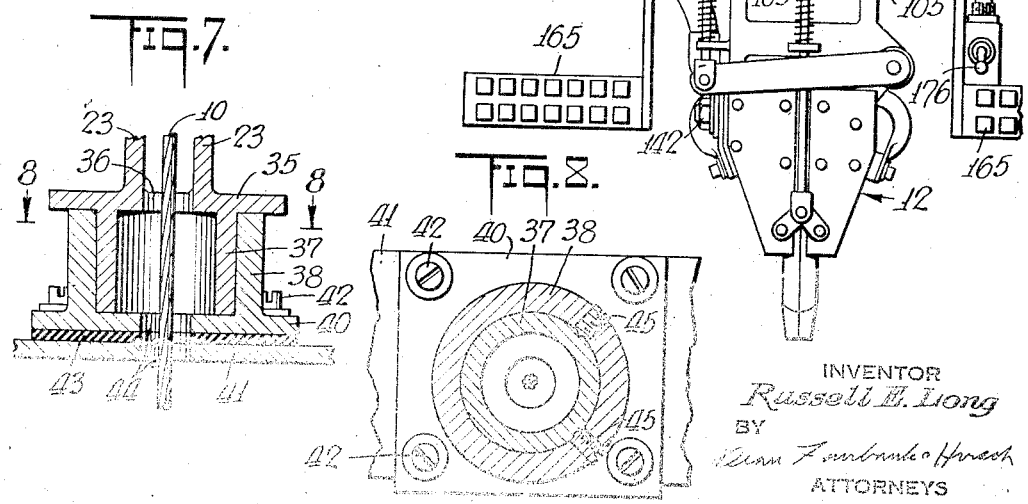
INVENTOR
Russell E. Long
BY
ATTORNEYS Patented Aug. 15, 1944

2,355,983

UNITED STATES PATENT OFFICE 2,355,983

ELECTRIC WELDING MACHINE

Russell E. Long, Western Springs, Ill., assignor to National Cylinder Gas Company, Chicago, Ill., a corporation of Delaware Application January 23, 1943, Serial No. 473,329

10 Claims. (Cl. 314—129)

The present invention relates to electric arc welding apparatus of the type wherein an arc is maintained between a fusible metallic electrode and the work, and said electrode is continuously fed as it is consumed in making the weld.

In one type of apparatus of this general character, for instance as shown in the Ross Patent 2,094,411, the electrode in the form of a wire or rod, is straightened by a series of rollers and advanced between a pair of opposed relatively yieldable contact nozzle sections or jaws which engage the electrode to guide it to the work and supply the necessary current to said electrode. If the pressure between the nozzle sections and the electrode is not uniform throughout the inner contact areas of said sections, said sections may wear unevenly, and this may result ultimately in unreliable electric contact between said electrode and said nozzle sections, restriction of the path of flow of the current, resistance to such flow, and excessive heat at those parts of the wire and the apparatus.

One object of the present invention is to provide a new and improved arc welding machine having a contact nozzle unit which is resiliently self-aligned in yieldable engagement with the advancing electrode wire uniformly along the entire contact area of said unit to assure reliable electrical contact with said electrode wire and uniform wear of said unit.

Another object is to provide an automatic or semi-automatic arc welding machine having new and improved means for straightening, feeding and guiding consumable electrode wire or rod from a reel or other suitable source continuously towards a workpiece.

A further object is to provide an automatic or semi-automatic arc welding machine having straightening, feeding, guiding and contacting means easily adjustable to accommodate heavy rods or wires of different sizes within a comparatively wide range.

Various other objects, features and advantages of the invention will be apparent from the following particular description, and from an inspection of the accompanying drawings, in which Fig. 1 is a perspective showing the rear of an automatic arc welding machine embodying the present invention;

Fig. 2 is a front elevation with certain parts shown broken away;

Fig. 3 is a side elevation partly in section;

Figure 1:
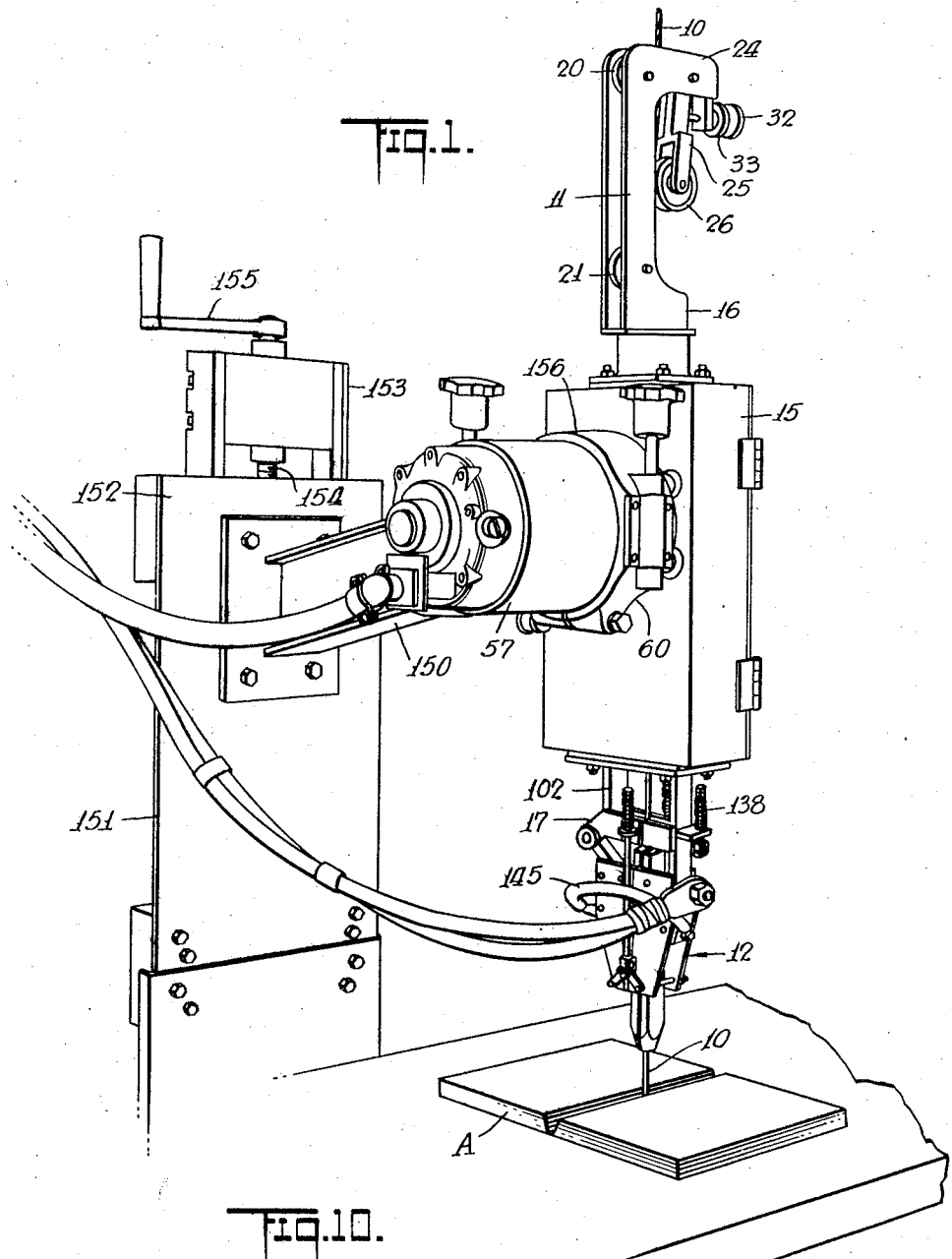
Figure 10:
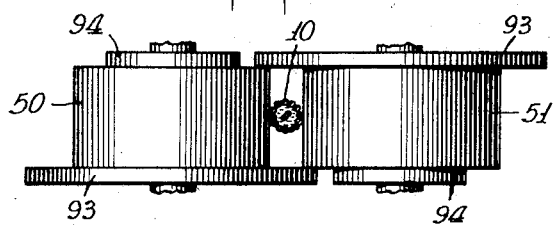

Figs. 4, 5 and 6 are sections taken on lines 4—4, 5—5 and 6—6 respectively of Fig. 2, but on a larger scale;

Fig. 7 is a section taken on line 7—7 of Fig. 3, but on a larger scale;

Fig. 8 is a section taken on line 8—8 of Fig. 7;

Fig. 9 is a front elevation of the lower contact unit of a semi-automatic form of arc welding machine embodying the present invention, and with the rod feeding and rod guiding parts separated by a flexible spacer; and Fig. 10 is a top plan view somewhat diagrammatic of an alternative form of means for guiding the electrode through the feeding section of the machine.

In the form of apparatus shown in the drawings, an electrode welding wire 10 is continuously fed to the workpiece A upon which the welding operation is to be performed. The welding rod 10 per se forms no part of the present invention, and may be of any suitable consumable construction. It contains the metal to be fused into the groove or channel between the piece A to be welded. This electrode wire 10 is preferably of the shielded type comprising a central flexible metal core with a coating of flux and a flux retainer, which is preferably in the form of wires spiralled and interwoven in opposite directions to form a braided mesh, and to conduct current to the main central wire. These external braided wires or flux retainers have parts in electrical contact with the center core and parts exposed on the outside of the flux so as to conduct the current to the core, and are consumed at the same rate as the core. The electrode wire commonly varies between ⅛ to ⁵⁄₁₆ of an inch, and is flexible enough so that it may be wound around a reel or drum, and unwound therefrom as it is continuously consumed during welding operations.

The machine shown in Figs. 1 to 8 includes an upper wire straightening device 11, a lower electrical contact device 12 and an intermediate wire feed device 13. All of these devices are interconnected into a single movable unit by a frame structure, which includes a housing 15 for the wire feed device 13, a stanchion 16 mounted on said housing and supporting the wire straightening elements to be described, and a bracket 17 secured to the underside of said housing 15 and supporting the contact device 12.

The wire straightening device 11 (Figs. 1, 2 and 3) includes a pair of superposed pulleys 20 and 21, which are desirably peripherally grooved and which are journalled in the stanchion 16. For supporting these pulleys 20 and 21, the stanchion 16 desirably comprises a pair of spaced plates 23 flanking the faces of said pulleys and serving as bearings or bearing supports for said pulleys. The upper ends of these stanchion plates 23 have transverse extensions 24 serving as bearings or bearing supports for a depending arm 25 formed at its lower end with a clevis on which is rotatably supported a pulley 26 desirably with a grooved circumference. This pulley 26 is disposed at a level substantially midway between the two pulleys 20 and 21, and at one side thereof, so that the electrode wire 10 as it is drawn off from a reel or other source rides between the two pulleys 20 and 21 on one side of said wire and the pulley 26 on the other side, and is straightened thereby. The pulley 26 is adjustable transversely of the advancing wire 10 by suitable means, as for example by an adjusting screw 30 threaded in a flange 31 rigid with the outer ends of the stanchion extensions 24 and bearing against the arm 25. The screw 30 carries at its outer end a turning knob 32 and can be locked in adjusted position by means of a suitable lock nut 33.

The rotative position of the straightening device 11 with respect to the rest of the machine can be adjusted by a suitable swivel support for said device. For that purpose, the two stanchion plates 23 are desirably interconnected at their lower ends by a base plate 35 (Figs. 1, 2, 3, 7 and 8) having an aperture 36 to permit the electrode wire to pass therethrough, and an annular pivot pin 37 depending from and rigid with said base plate, and extending into a bearing sleeve 38 with a snug rotative fit. This bearing sleeve 38 has a base plate 40 connected to the top wall 41 of the feed housing 15 by suitable means such as bolts or studs 42, and desirably insulated therefrom by an insulator plate 43. The base plate 40, insulator plate 43 and top housing wall 41 are provided with aligned apertures 44 to permit passage of the electrode wire therethrough into the housing 15. The straightening device 11 is locked into adjusted rotative positon by any suitable means, as for instance by set screws 45 threaded in the bearing sleeve 38, and impinging on the swivel pin 37. This arrangement not only allows for rotative adjustment of the straightening device 11, but also permits the attachment or removal of this device as a unit.

For automatically drawing the electrode wire from the reel and feeding it towards the workpiece as the wire is consumed, there is provided a series of drive rollers 50 (Figs. 2–6) mounted in the feed housing 15 on one side of the path of travel of the electrode wire 10, and a corresponding number of idler rollers 51 on the other side of said path bearing on said wire against said drive rollers respectively to establish the necessary traction feed grip between said drive rollers and said wire. Each of these drive rollers 50 is supported in the feed housing 15 by any suitable means, which for example may comprise an axle 52 (Fig. 4) welded, riveted, or otherwise made rigid at one end to the rear wall 53 of the feed housing 15, while the other end is detachably secured to a cover plate 49 by the studs 48, or the like. Each of the drive rollers 50 comprises a hub 55 which is journalled on a bushing 54 on the axle 52 and which carries a tire 56 of suitable traction insulating material, such as rubber or neoprene.

For driving the rollers 50, there is provided a motor 57 supported on a frame rigid with the rear wall 53 of the feed housing 15. A drive gear 58 in the housing 15 is driven from the motor 57 through a suitable reduction gearing unit 60. Each of the axles 52 carries a driven gear 61 made rigid with a respective roller 50 by any suitable means, as for example by the studs 62. The two upper driven gears 61 mesh with the drive gear 58 on opposite sides thereof, while the lower driven gear 61 is driven from the middle driven gear 61 through an intervening idler gear 63. By means of this train of gears, the three drive feed rollers 50 are rotated at the same peripheral speed. This speed can be manually controlled from the motor 57 according to the rate at which the electrode wire 10 is consumed, or may be automatically controlled to maintain a predetermined arc gap between the lower end of the electrode wire 10 and the surface on which the fused metal is being deposited. This automatic control can be established in any well-known manner, as for instance in accordance with the voltage drop between the electrode and the workpiece.

The idler rollers 51 are supported on and between a backing plate 70 adjacent to the rear wall 53 of the feed housing 15 and a cover plate 71 spaced therefrom. The support for each of these idler rollers 51 desirably includes an axle 72 welded, riveted or otherwise rigidly secured at one end to the backing plate 70, and detachably secured at the other end to the cover plate 71, as for instance by studs 73. Each of the idler rollers 51 may comprise a hub 75 supported on a bushing 76 embracing the respective axle 72, and a tire 77 on said hub of suitable resilient insulating material such as rubber or neoprene.

The idler rollers 51 are made adjustable with respect to the opposed drive rollers 50 desirably by supporting the two plates 70 and 71 and said idler rollers as a movable unit. For that purpose, the backing plate 70 has elongated slots 80 near its top and bottom, and is guided for adjusting movement by studs 81 passing through said slots and threaded into the rear wall 53 of the feed roller housing 15.

Although there is shown and described a set of drive rollers 50 and an opposed set of idler rollers 51, as far as certain aspects of the invention are concerned both sets of rollers may be motor driven at the same peripheral speed, so that the electrode 10 is driven from opposite sides.

Since the peripheries of the feed rollers 50 and 51 are cylindrical, the electrode wire 10 is apt to slip off these rollers in a direction lengthwise thereof. To avoid this, the electrode wire 10 is guided between superposed pairs of rollers 50 and 51 by means of a pair of guides 85, each desirably including a block 86 fixed to the backing plate 70 by any suitable means, as for instance by welding, and carrying a ring 87 through which electrode wire 10 is guided. This guide ring 87 is secured to an arm 88 fixed to the block 86, as for instance by studs 90, and insulated from said block and said stud by any suitable means, as for instance by the use of spacer plates, bushings and washers of insulating material.

The wire guides 85 are adjusted into desired position by suitable means comprising for example adjusting screws 95 threaded in a side wall 96 of the feed roller housing 15, and bearing on respective guide blocks 86. Each of the adjusting screws 95 carries a turning knob and is held in adjusted position by a lock nut 98. The turning of the adjusting screws 95 not only moves the guide rings 87 into desired position, but at the same time moves the plates 70 and 71 and the idler rollers 51 supported on said plates.

In Fig. 10 is shown diagrammatically alternative means for guiding the electrode 10 between the ends of the rollers 50 and 51. In this alternative form, a disk or washer 93 of suitable insulating material such as fibre is mounted at the end of one of each pair of opposed rollers 50 and 51, and is large enough to overlap the end of the other roller of said pair. Two of such large washers 93 are provided for each pair of opposed rollers 50 and 51, and both of these washers may be mounted on the same roller, but are desirably mounted alternately between the two rollers as shown in Fig. 10. With this construction, the electrode 10 is confined between the rollers 50 and 51 and between the overlapping sections of the washers 93. If desired, smaller washers 94 of insulating material such as fibre can be alternately arranged with respect to the larger washers 93 as shown in Fig. 10.

The housing 15 is desirably closed by a door 97 hinged to the side of said housing. With this arrangement, the electrode wire 10 in the feed section of the machine will be entirely enclosed during welding operations, thereby protecting the operator against possible shock from said wire.

The wire 10 is continuously advanced by the feed rollers 50 and 51 through the contact unit 12 towards the workpiece. This unit 12 desirably forms a detachable unit with respect to the feed roller housing 15, and includes a nozzle split into two similar parts or jaws 100 and 101 having respective channels of semi-circular cross-sections to frictionally contact the wire 10, and to hold it near the workpiece. The frame bracket 17 for supporting these contact nozzle parts 100 and 101 is formed as for example by a pair of similar parallel plates 99 facing each other and suspended from the feed roller housing 15 by a pair of hangers 102, the lower ends of which are welded or otherwise rigid with said bracket plates, while their upper ends are welded or otherwise made rigid with a plate 103. This plate 103 is removably secured to the bottom wall 104 of the housing 15 by bolts or studs 105, and is suitably insulated from said housing as for example by a spacer plate 106 of insulating material. The plates 103 and 106 and the housing wall 104 are provided with aligned apertures to permit the wire 10 to pass therethrough. The two bracket plates 99 are sufficiently spaced apart to permit the wire 10 to continue unimpeded therebetween.

The nozzle parts 100 and 101 are resiliently self-alignable relatively into electrical contact with the wire 10. As a feature of the present invention, at least one of the nozzle parts 101 has a floating support which resiliently urges this nozzle part at spaced points into contact with the wire 10, so that surface engagement of said nozzle part with said wire is maintained throughout the entire contacting length of said nozzle part. In carrying out this feature of the present invention, the nozzle part 100 is fixed, and for that purpose is desirably clamped between a pair of frame plates 110 rigid with the bracket 17 as for example by means of a pair of depending arms 111 and 112 welded or otherwise affixed to said bracket and connected to said frame plates 110 by studs, bolts or rivets 113. The depending arm 111 may be separate from the hanger 102 above it or may constitute an extension of said hanger as shown. The nozzle part 100 is of rectangular outline to fit snugly between the frame plates 110, and is either frictionally retained between the frame plates 110 or otherwise secured thereto, as for instance by welding, riveting or bolting.

The other nozzle part 101 is similar in shape to the nozzle part 100, and has a resilient floating support which causes said nozzle part 101 to become self-aligned into surface contact with the wire 10. This floating nozzle support comprises a pair of spaced frame plates 116 similar to the frame plates 110, and retaining the nozzle part 101 therebetween, as for example by friction, welding or bolting to form a movable unit therewith. The lower ends of these frame plates 116 are resiliently urged towards the fixed frame plates 110 by toggle joints, two of these being provided centrally on opposite sides of the frame plates 110 and 116. Each of these toggle joints comprises a pair of links 117 jointed together and pivotally connected to the lower ends of the two pairs of frame plates 110 and 116. A rod 120 has a clevis 121 at its lower end pivotally connected to the elbow junction of the two toggle links 117, and has its upper part slidably passing through a lug 122 welded or otherwise rigid with the side of the bracket 17. A coil spring 123 encircling the toggle rod 120 is seated on the lug 122, and bears against a spring pressure adjusting nut 124 threaded on said rod, so that said rod is continuously biased upwardly to urge the lower end of the movable nozzle part 101 towards the fixed nozzle part 100.

The upper end of the nozzle part 101 is urged towards the fixed nozzle part 100 by means of a bell crank lever comprising a crank shaft 130 journalled in the two bracket plates 99 and projecting at one end beyond one of said plates, a comparatively long arm 131 on the outside of said plates secured to the projecting end of said shaft, and a shorter arm 132 affixed to said crank shaft between said plates and extending between the two nozzle supporting plates 116. The outer end of the shorter crank arm 132 has a pivot connection 133 to these nozzle supporting plates 116 so that clockwise movement of the crank levers 130, 131 and 132 as viewed in Fig. 2 causes movement of the upper end of said plates inwardly towards the fixed nozzle part 100 and corresponding movement of the nozzle part 101 fixed to said plates.

The means for biasing the crank levers 130, 131, 132 in a clockwise direction (Fig. 2) desirably comprises a rod 136 having a forked end pivotally secured to the outer end of the crank arm 131, and slidably passing through a lug 137 welded or otherwise rigid with one end of the bracket 17. A coil spring 138 encircling the rod 136 is seated on the lug 137, and bears against a spring pressure adjusting nut 140 threaded on said rod.

The nozzle part 101 as described has a floating support which permits said part to move not only transversely of the advancing wire 10, but also slightly lengthwise thereof. This causes the nozzle part 101 to align itself into proper contact with respect to the wire 10 and the other nozzle part 100, as the wire is advanced towards the workpiece. By applying aligning spring pressure to spaced sections of the nozzle part 101 along the length thereof, effective electrical contact engagement of the entire length and area of the two nozzle parts 100 and 101 with the wire 10 is assured. This pressure is not sufficient to prevent the feeding of the wire 10 therethrough at the desired controlled rates, and can be regulated by means of spring adjusting nuts 124 and 140.

The electric wire fusing current is delivered to the contact nozzles 100 and 101 through a binding post 142 mounted on a conductor plate 143 welded or otherwise made rigid with the nozzle supporting plates 110. A second conductor plate 144 is welded or otherwise made rigid with the two nozzle supporting plates 116, and a conductor strap 145 is electrically connected to binding posts on conductor plates 143 and 144. The current is delivered from a suitable conductor to the binding post 142 through the frame plates 110 to the contact nozzle part 100, and is branched off from the conductor plate 143 to conductor plate 144 through the frame plates 116 to the other contact nozzle part 101. From these nozzle parts 100 and 101 the current is transmitted to the metallic parts of the wire 10 to form a metal fusing arc at its lower end. The workpiece or the supporting table is grounded or otherwise connected to the other side of the current supply.

The welding machine is supported for automatic movement over the workpiece in any well-known manner, or may have a stationary support and the work may be fed beneath the machine. For example, an arm 150 connected between the frame of the motor 57 and a carriage 151 (Fig. 1) supports the welding machine in upright position. This carriage 151 can be moved automatically or manually along track or tracks to advance the welding machine over the workpiece as the welding progresses. If desired, the welding machine can be universally moved over the workpiece by a cross-carriage arrangement of the well-known type, comprising a pair of cross-carriages movable at right angles to each other, the carriage which carries the welding machine being supported on the other carriage.

In another form the electrode 10 can be carried on a self-contained tractor which has a coil wire control panel so that it may be run along a seam similar to the seam on a deck plate.

The vertical position of the welding machine can be adjusted as for instance by means of a vertical slide 152 fixed to the arm 150 and supported on the carriage 151. This slide 152 is movable along a guide 153, and can be raised or lowered by means of a feed screw 154 threaded in said slide and having a suitable handle 155.

The welding machine can be angularly adjusted in any desired operating position. For that purpose, the housing 15 can be secured to the casing of the motor 57 by means of a clamp 156 which allows said machine to be tilted above the axis of said motor and locked in desired tilted position. The machine can also be adjustably tilted about the longitudinal axis of the arm 150 by means of an adjustable coupling connection 157 (Fig. 2).

In Fig. 9 is shown a semi-automatic form of arc welding machine which may be manually guided by the operator for welding, for example, irregular shapes or seams that do not follow a given straight line. In this construction, the contacting unit 12 is exactly like the contacting unit shown in the constructions of Figs. 1 to 8, except that this unit is supported from the lower end of the feed housing 15 by a flexible connection which permits this contacting unit to be manually steered into position with respect to said housing. For that purpose, there is desirably provided a hose supporting frame structure detachably secured to the underside of the housing 15, and comprising a pair of vertically spaced plates 157 and 158 interconnected by a rigid sleeve 159 as for instance by welding, and provided with apertures in alignment with the hollow of said sleeve to permit the passage of the wire 10 therethrough. This frame structure 157, 158 and 159 is detachably connected to the housing 15 by bolts or studs 160 passing through the plate 157 and is insulated from said housing by an insulator spacer plate 161.

Coupled to the underside of the plate 158 by any suitable means is the upper end of a hose 162 made of suitable flexible insulating material such as rubber. The lower end of this flexible hose 162 is detachably coupled to a hand steering device attached to the contacting unit 12. This steering device desirably includes a pair of handle bars 165 joined by a U-shaped bracket, having an apertured base plate 166 attached to the frame plate 103 of the contacting unit 12 by bolts or studs 105. This base plate 166 is desirably separated from the contacting frame plate 103 by the insulator plate 106, and is also insulated by any suitable means from the wire 10 passing through the aperture of said plate 166.

A sheathed flexible conductor 171 connected to the binding post 142 of the contacting unit 12, is attached to the flexible hose 162, as for instance, by means of clamps 172, and is supported by a bracket 173 or similar fastening means to the underside of the plate 158. Also connected to the flexible hose 162 by the clamps 172 is a conductor 174 in the circuit of the wire feeding motor 57, fastened to the underside of the plate 158, as for example by a hook 175. A switch 176 controlling this motor 47 is disposed near one of the handle bars 165 in accessible position to be operated by the thumb of the hand grasping said bar.

The whole unit below the feed housing 15 shown in Fig. 9 can be readily mounted to replace the contacting unit shown in Figs. 1 to 8.

Although the invention is shown applied to an arc welding machine, as far as certain aspects of this invention are concerned, it can be applied to any machine in which an electrode wire or rod is fused to form a metal deposit, and is continuously advanced as said electrode or wire is consumed.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. An electric welding apparatus having a pair of contact members on opposite sides of the path of travel of the electrode rod for holding said rod therebetween, guiding the latter and supplying current thereto, resilient means acting on one of said contact members adjacent to one end thereof for resiliently pressing it toward the other contact member, and separate resilient means acting on said first mentioned member adjacent to the opposite end thereof for resiliently pressing it toward the other contact member.

2. In an electric welding machine, a pair of opposed jaws conjointly forming a nozzle to guide an electrode rod towards the workpiece, one of said jaws being fixed while the other jaw is movable towards or away from said fixed jaw, and separate resilient means pressing opposite ends of said movable jaw towards said fixed jaw and against said rod.

3. An electric welding machine having a pair of opposed contact members for holding an electrode rod therebetween near the workpiece and supplying arcing current to said rod, a spring-pressed toggle device for resiliently urging one end portion of one of said contact members against said rod, and separate spring-pressed means resiliently urging the other end portion of said last-mentioned contact member against said rod.

4. In an arc welding machine, means for feeding an electrode to a workpiece, a pair of opposed contact jaws jointly forming a nozzle to guide an electrode wire toward the workpiece and supply arcing current to said wire, one of said jaws being fixed to said feeding means and the other movable in respect thereto, and resilient means pressing said movable jaw toward said fixed jaw and into frictional engagement with said wire, and including a bell crank lever having one end extending transversely above the movable jaw, and the other pivotally connected to the movable jaw, and a spring yieldingly pushing said first mentioned arm away from both of said jaws.

5. An arc welding machine having a bracket, a pair of opposed jaws for holding and guiding an electrode in its passage toward the workpiece and for supplying current to said wire, one of said jaws being rigidly secured to said bracket and the other jaw being movable, a bell crank lever engaging one end of the movable jaw, a toggle link engaging the opposite end of said movable jaw, and separate resilient means for actuating said bell crank lever and said toggle link for yieldingly pressing the opposite ends of said movable jaw toward the other jaw.

6. In an arc welding machine, a pair of opposed jaws conjointly forming a nozzle guide conduit for an electrode wire, at least one of said jaws being movable towards the other, a spring-pressed toggle connection for resiliently urging a section of said movable jaw towards the other jaw and into frictional engagement with said electrode wire, and a spring-pressed bell crank lever resiliently urging another section of said movable jaw towards the other jaw and into frictional engagement with said electrode wire, said latter section being spaced from said first section lengthwise of said conduit.

7. An arc welding machine comprising a fixed bracket defining a passageway through which an electrode wire is adapted to pass towards the workpiece, a pair of opposed contact jaws directly below said bracket for holding and guiding said wire therebetween and for supplying arcing current to said wire, jaw supporting frames rigid with said jaws respectively and supported from said bracket, and means for resiliently pressing said jaws relatively towards each other into frictional engagement with said wire and including a plurality of force transmitting members pivotally connected to one of said frames adjacent to opposite ends thereof, and independently adjustable springs seated on said bracket and bearing on said force transmitting members respectively.

8. An arc welding machine comprising a fixed bracket, a pair of opposed contact jaws for holding and guiding an electrode wire in its passage towards the workpiece, and for supplying arcing current to said wire, jaw supporting frames rigid with said jaws respectively and supported from said bracket, one of said frames being fixed while the other has a floating support permitting it to move towards or away from said fixed jaw frame, a toggle connection on each side of said frames having a pair of jointed links pivotally connected to said jaw frames respectively, and a rod pivotally secured to the elbow junction of said links, and a pair of coil springs encircling said toggle rods respectively and bearing on said bracket for independently spring-pressing each of said toggle connections.

9. An arc welding machine comprising a fixed bracket, a pair of opposed jaws below said bracket for holding and guiding an electrode wire in its passage towards the workpiece and for supplying current to said wire, jaw supporting frames rigid with said jaws respectively, one of said frames being movable towards or away from the other frame, a bell crank lever supported at its crank axis on said bracket and having one arm pivotally connected to said movable jaw frame, and a spring bearing on said bracket and pressing on the other arm of said lever to resiliently urge said lever in a rotative direction to yieldably press said movable jaw frame towards the other jaw frame.

10. In an automatic arc welding machine, the combination comprising a pair of opposed contact nozzle sections, a pair of frame members for said nozzle sections respectively, means rigidly but detachably supporting one of said frame members, means supporting the other frame member for movement towards or away from the fixed frame member, and means for separately resiliently pressing the upper and lower portions of said movable frame member towards the other frame member to effect firm frictional contact engagement of said nozzle sections with said electrode wire.

RUSSELL E. LONG.